US009087096B1

(12) United States Patent
Khroustaleva

(10) Patent No.: US 9,087,096 B1
(45) Date of Patent: Jul. 21, 2015

(54) SYSTEMS, METHODS, AND MEDIA FOR CONTROLLING THE PRESENTATION OF SEARCH RESULTS WITH ADVERTISEMENT INDICATIONS

(71) Applicant: Olga Khroustaleva, San Francisco, CA (US)

(72) Inventor: Olga Khroustaleva, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/706,026

(22) Filed: Dec. 5, 2012

(51) Int. Cl.
    *G06F 17/30* (2006.01)
(52) U.S. Cl.
    CPC .... *G06F 17/30424* (2013.01); *G06F 17/30864* (2013.01); *G06F 17/30997* (2013.01)
(58) Field of Classification Search
    CPC ............... G06F 17/30864; G06F 17/30997
    USPC ........................................................ 707/722
    See application file for complete search history.

(56) References Cited

U.S. PATENT DOCUMENTS

| | | | | |
|---|---|---|---|---|
| 5,913,040 | A * | 6/1999 | Rakavy et al. | 709/232 |
| 6,248,946 | B1 * | 6/2001 | Dwek | 84/609 |
| 6,317,789 | B1 * | 11/2001 | Rakavy et al. | 709/224 |
| 8,180,672 | B2 * | 5/2012 | Curtis et al. | 705/14.4 |
| 8,521,587 | B2 * | 8/2013 | Curtis et al. | 705/14.4 |
| 2008/0155589 | A1 | 6/2008 | McKinnon et al. | |
| 2012/0016748 | A1 | 1/2012 | Aaltonen et al. | |

FOREIGN PATENT DOCUMENTS

WO   WO/2008/085637   7/2008

* cited by examiner

*Primary Examiner* — Joshua Bullock
(74) *Attorney, Agent, or Firm* — Byrne Poh LLP

(57) ABSTRACT

Systems, methods, and media for controlling the presentation of search results with advertisement indications are provided. In some embodiments, systems for controlling the presentation of search results with advertisement indications are provided, the systems comprising: at least one hardware processor configure to: receive a search request; identify a plurality of pieces of media content corresponding to the search request; for each of the plurality of pieces of media content, determine if an advertisement is configured to be presented with a presentation of the piece of media content; generate search results identifying the plurality of pieces of media content; and generate presentation data that specifies the manner in which the search results are to be presented based on the determination.

3 Claims, 9 Drawing Sheets

SYSTEMS, METHODS, AND MEDIA FOR CONTROLLING THE PRESENTATION OF SEARCH RESULTS WITH ADVERTISEMENT INDICATIONS

BACKGROUND

With the explosive growth of the Internet, high-speed communications, and digital recording technology, there has been a continued growth in the availability of online media content (such as videos, audio, images, graphics, text, etc.) and the number of instances of users accessing such online media content. For example, video sharing Web sites are incredibly popular and users can use such Web sites to be presented with videos on almost any conceivable subject.

In many instances, media content is configured to be presented with an advertisement. This advertisement can provide a revenue stream for the host of the Web site and/or the provider of the media content. To insure that this revenue stream is not lost, in many instances users cannot view the media content without first viewing the advertisement, or at least a portion of the advertisement.

Frequently, however, a user may object to having to be presented with an advertisement before being able to be presented with desired media content. For example, a user may object because the user does not want to watch the advertisement, because the user does not want to use bandwidth on the media content, or for any other suitable reason. To make matters worse, in many instances a user only becomes aware that an advertisement is to be presented after at least a significant portion of the advertisement has be transferred to the user's user device (e.g., such as a mobile phone).

Accordingly, mechanisms for improving a user's experience when accessing media content are desirable.

SUMMARY

Systems, methods, and media for controlling the presentation of search results with advertisement indications are provided. In some embodiments, systems for controlling the presentation of search results with advertisement indications are provided, the systems comprising: at least one hardware processor configure to: receive a search request; identify a plurality of pieces of media content corresponding to the search request; for each of the plurality of pieces of media content, determine if an advertisement is configured to be presented with a presentation of the piece of media content; generate search results identifying the plurality of pieces of media content; and generate presentation data that specifies the manner in which the search results are to be presented based on the determination.

In some embodiments, methods for controlling the presentation of search results with advertisement indications are provided, the methods comprising: receiving a search request; identifying a plurality of pieces of media content corresponding to the search request; for each of the plurality of pieces of media content, determining if an advertisement is configured to be presented with a presentation of the piece of media content; generating search results identifying the plurality of pieces of media content; and generating presentation data that specifies the manner in which the search results are to be presented based on the determination.

In some embodiments, non-transitory computer-readable media containing computer-executable instructions that, when executed by a processor, cause the processor to perform a method for controlling the presentation of search results with advertisement indications are provided, the method comprising: receiving a search request; identifying a plurality of pieces of media content corresponding to the search request; for each of the plurality of pieces of media content, determining if an advertisement is configured to be presented with a presentation of the piece of media content; generating search results identifying the plurality of pieces of media content; and generating presentation data that specifies the manner in which the search results are to be presented based on the determination.

DETAILED DESCRIPTION

Systems, methods, and media for controlling the presentation of search results with advertisement indications are provided.

In accordance with some embodiments, mechanisms are provided for determining whether a piece of media content, such as a video, audio, an image, graphics, text, etc., corresponding to a search request is to be presented with an advertisement, and, if so, for providing an indication that the advertisement is to be presented in search results identifying the piece of media content.

Figure 1:
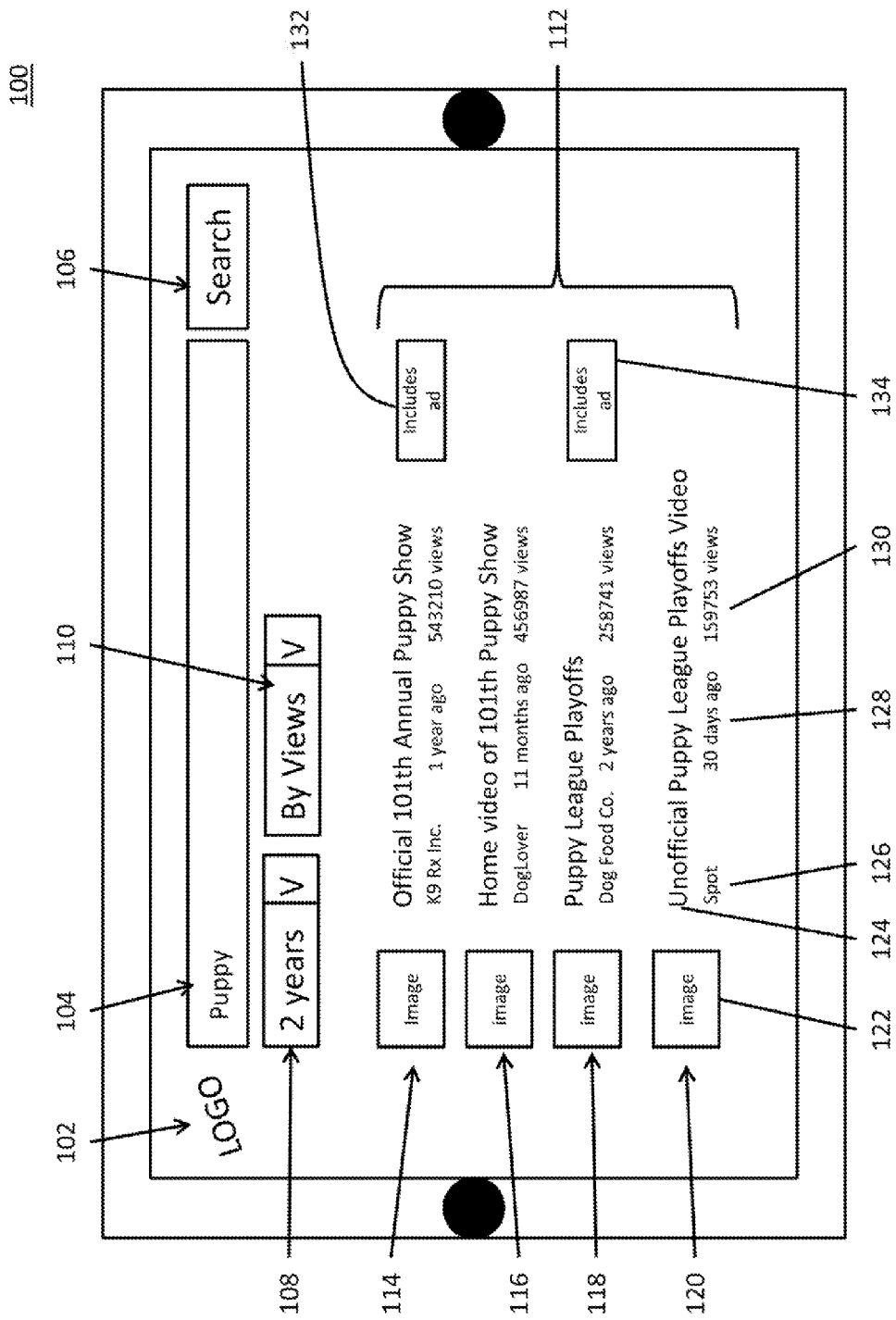
FIG. 1 is an example of a user interface for a search mechanism showing advertisement indications as indicators in accordance with some embodiments.

Turning to FIG. 1, an example 100 of a user interface for searching for and accessing media content on a user device in accordance with some embodiments is illustrated. As shown, in some embodiments, user interface 100 can include a provider logo 102, a search term entry field 104, a search button 106, a filter option 108, a sort option 110, and search results 112.

Logo 102 can be any suitable logo of any suitable provider of user interface 100 and can include any suitable text, graphics, images, video, etc. in accordance with some embodiments.

Search term entry field 104 can be any suitable field for entering search terms for a media content search in accordance with some embodiments. For example, as shown, field 104 can be a text entry box for receiving typed text. As another example, field 104 can be a window for entering hand-written text. Search button 106 can be any suitable mechanism for receiving an indication from a user that a search can be performed in accordance with some embodiments. In some embodiments, search button 106 can be omitted and a search can be performed for each character or word entered in field 104 or can be performed after a suitable period of time after a user has entered a search term in field 104.

Filter option 108 can be any suitable mechanism, such as a drop down menu, for receiving a user's selection of any suitable one or more filters to be applied to search results in accordance with some embodiments. For example, as shown, filter option 108 can be used to limit search results to content posted in a given period of time (e.g., the past two years). In some embodiments, filter option 108 can be omitted.

Sort option 110 can be any suitable mechanism, such as a drop down menu, for receiving a user's selection of any suitable one or more sort controls to be applied to search results in accordance with some embodiments. For example, as shown, sort option 110 can be used to sort search results by the number of views associated with the results. In some embodiments, sort option 110 can be omitted.

Search results 112 can be any suitable search results, such as such results 114, 116, 118, and 120, for any suitable media content in accordance with some embodiments. The search results can include any suitable information and that information can be presented in any suitable manner. For example, in some embodiments, information can be presented using text, graphics, images, video, sounds, audio, etc. As another, more-particular example, this information can include a thumbnail image 122, a title in text format 124, a name of the source of the content in text format 124, an age of the content in text format 128, and a count of the number of views of the content in text format 130.

As also shown, for some of the search results, such as search results 114 and 118, an indicator, such as indicators 132 and 134, respectively, may be used to provide an indication that the content corresponding to the search results, when presented, will be presented with an advertisement. Such an indicator can be any suitable icon, text, image, video, logo, graphics, sound, audio, etc. For example, as shown in FIG. 1, the word "includes ad" can be presented next to the corresponding search results. As another example, any suitable icon can be presented next to the corresponding search results. As yet another example, when a user taps or hovers over a search result, a sound can be presented to indicate that an advertisement will be presented with the content.

One or more of search results 112 can be selected by a user in order to request a presentation of the selected media content. The user can selected one or more of the search results in any suitable manner. For example, the user can select a search result by touching a search result presented on a touch-screen display. As another example, the user can select a search result by highlighting a search result and pressing an enter button or a play button.

Figure 2:
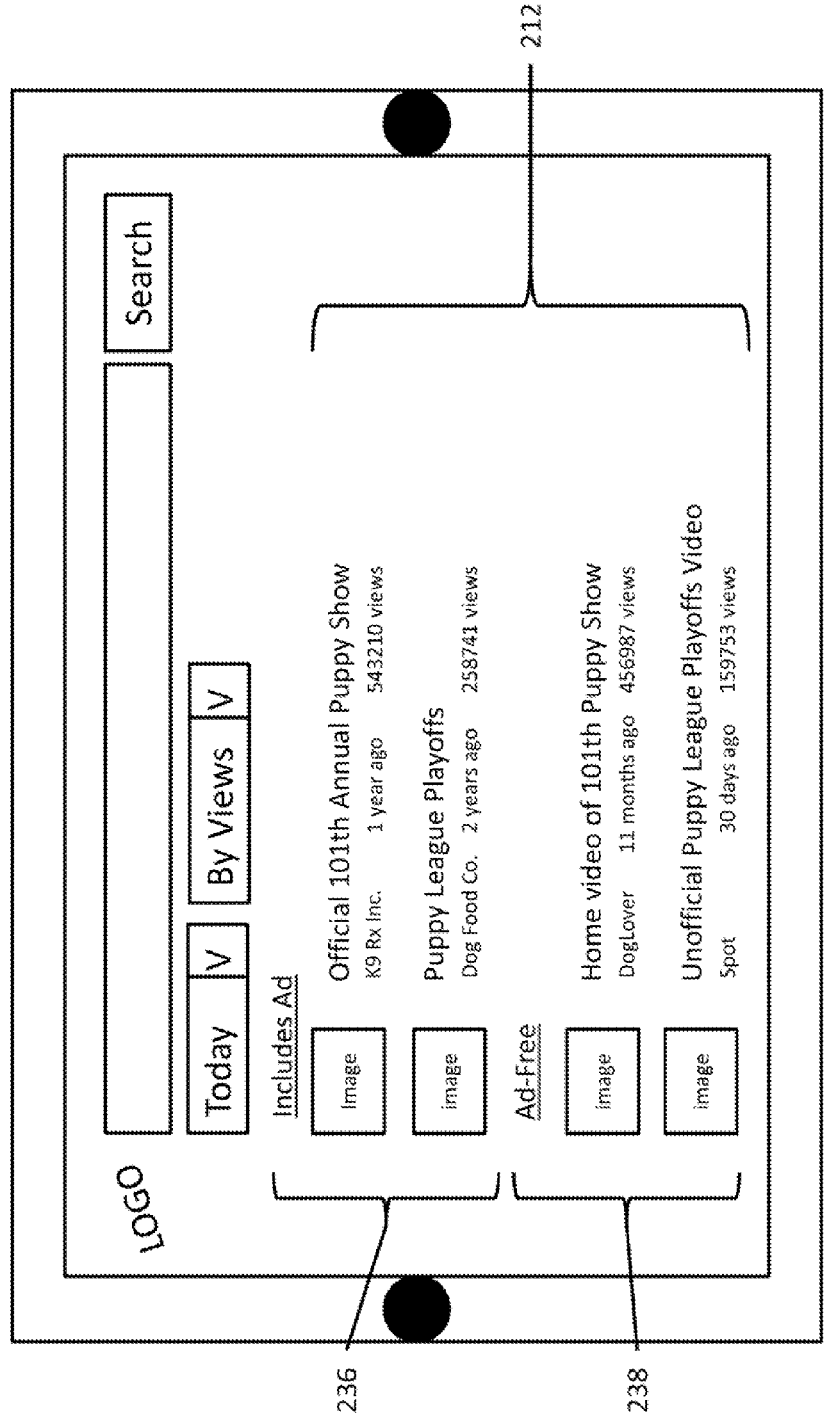
FIG. 2 is another example of a user interface for a search mechanism showing advertisement indications using search result groupings in accordance with some embodiments.

FIG. 2 shows another example 200 of a user interface for searching for and accessing media content on a user device in accordance with some embodiments. As illustrated, in user interface 200, an indication can be provided that an advertisement will be presented with content corresponding to search results by arranging the search results into two or more groups in accordance with some embodiments. For example, one group 236 may indicate that the results each "Include Ad," and hence that an advertisement will be presented when the content is presented. Another group 238 may indicate that the results are "Ad-Free," and hence that the corresponding content will be presented without an advertisement.

Figure 3:
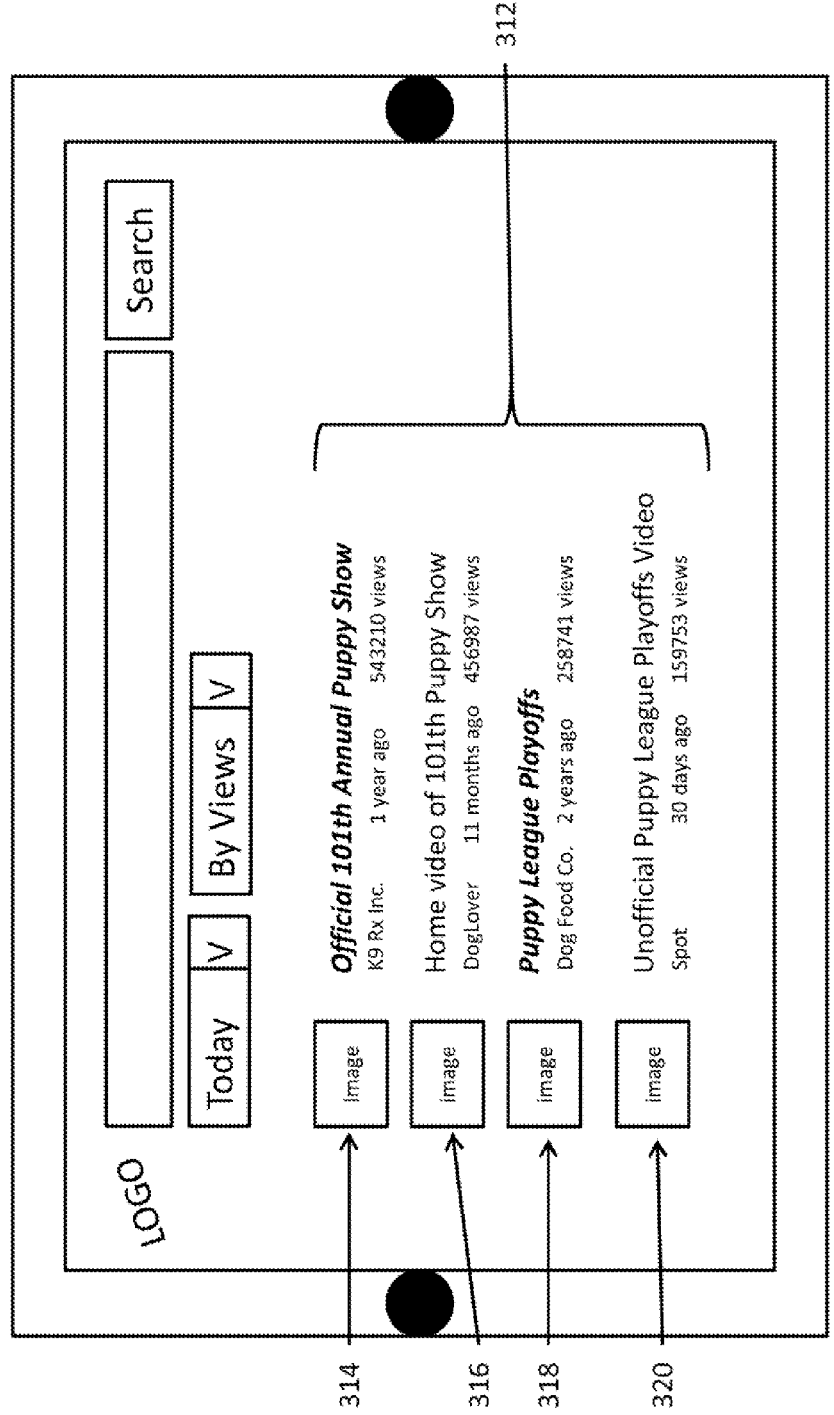
FIG. 3 is yet another example of a user interface for a search mechanism showing advertisement indications using different fonts or font styles in accordance with some embodiments.

FIG. 3 illustrates yet another example 300 of a user interface for searching for and accessing media content on a user device in accordance with some embodiments. As shown, in user interface 300, an indication can be provided that an advertisement will be presented with content corresponding to search results by altering the manner in which information about the content is presented. For example, as shown, search results 314 and 318 can be presented such that the title of the content is presented in a different font or style (e.g., bold italics) to indicate that an advertisement will be presented with content corresponding to these search results. Search results 316 and 320, on the other hand, can be presented in a different font or style (e.g., non-bold, non-italics) to indicate that content corresponding to these search results will be presented without an advertisement.

Figure 4:
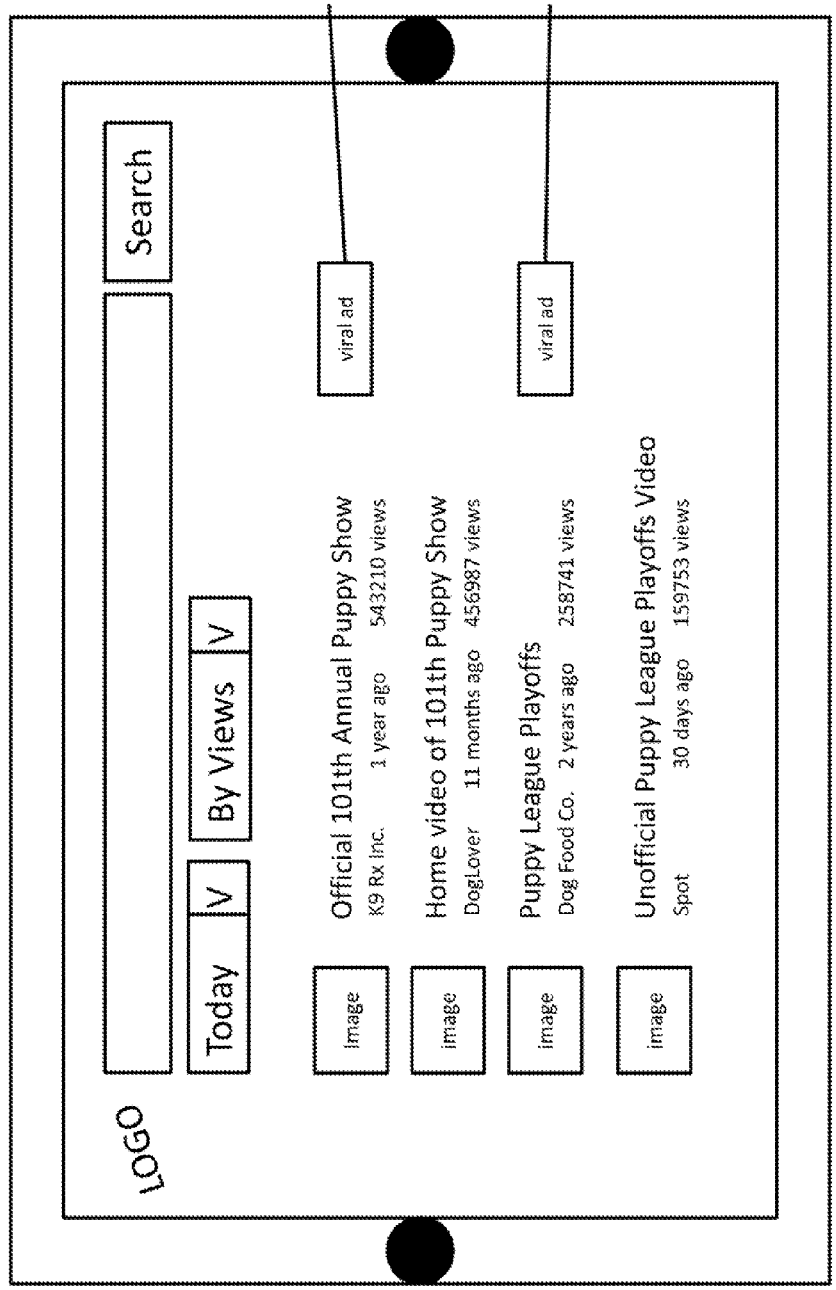
FIG. 4 is still another example of a user interface for a search mechanism showing advertisement indications using advertisement-characteristic-displaying indicators in accordance with some embodiments.

In some embodiments, an indicator that is used to indicate that an advertisement will be presented with content corresponding to a search result can provide any suitable information about the advertisement. For example, as shown in FIG. 4, indicators 432 and 434 can indicate that advertisements to be presented with content corresponding to the shown search results are "viral" (that is, extremely popular) advertisements. As a result, the user may be enticed to select one of these search results in order to see a popular advertisement, which the user may enjoy. As another example, an indicator may indicate a company, a product, a service, a length, a format, and/or any other suitable characteristic(s) associated with an advertisement to be presented with content associated with a search result.

Figure 5:
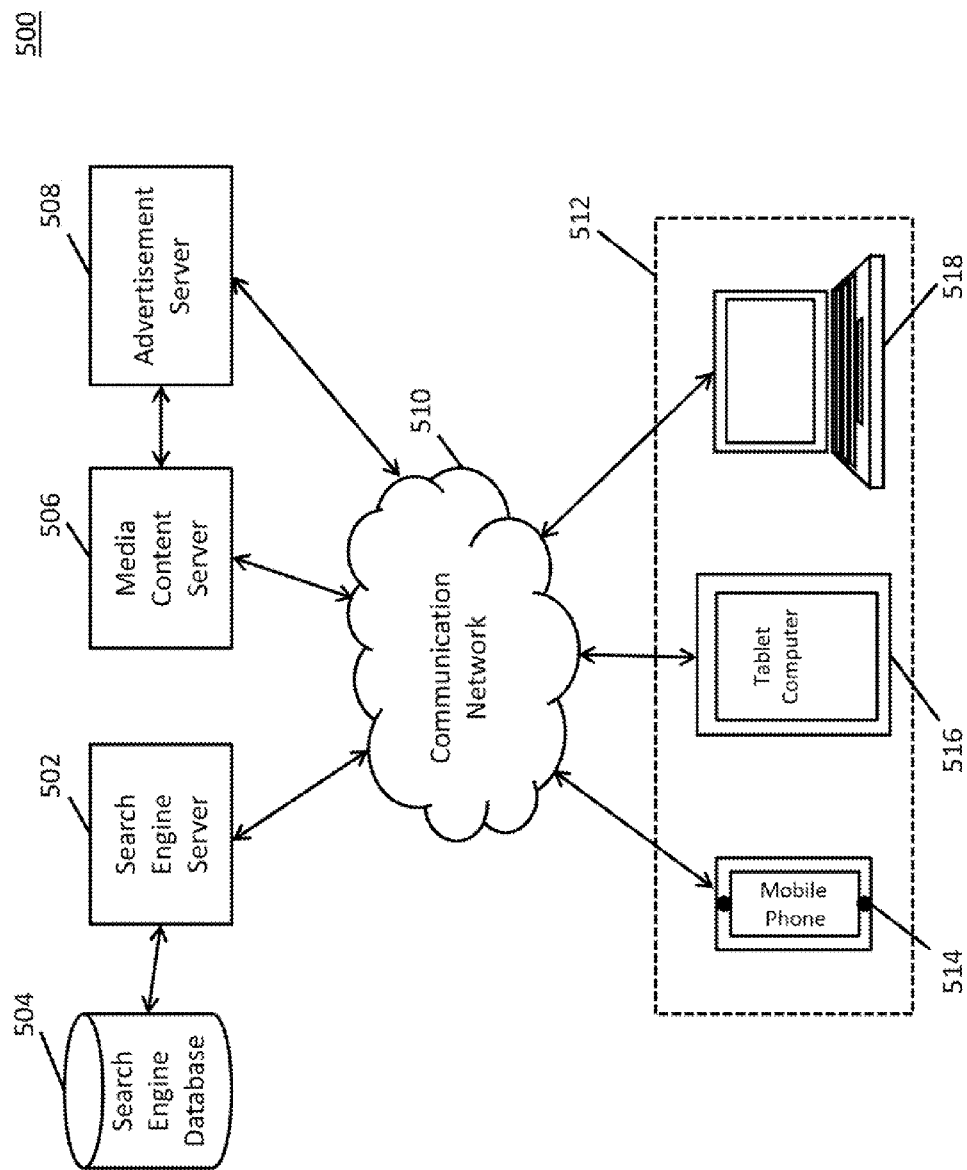
FIG. 5 is an example of hardware that can be used in accordance with some embodiments.

Turning to FIG. 5, an example 500 of hardware that can be used in accordance with some embodiments is shown. As illustrated, hardware 500 can include a search engine server 502, a search engine database 504, a media content server 506, an advertisement server 508, a communication network 510, and one or more user devices 512, such as a mobile phone 514, a tablet computer 516, and/or a laptop computer 518.

Search engine server 502 can be any suitable search engine server in accordance with some embodiments. For example, search engine server 502 can be a search engine that receives search requests sent from a Web browser and returns search results in a Web page. As another example, search engine server 502 can be a search engine that receives search requests from a dedicated media presentation application and returns search results in a format specifically tailored for that application.

In some embodiments, search engine server 502 can control the manner in which the search results are presented to a user. For example, server 502 can control whether the search results are presented in one or more of the manners described above in connection with FIGS. 1-4.

Search engine database 504 can be any suitable search engine database for storing data relating to media content available for presentation in some embodiments. For example, this data can include the title of content, the source of content, the number of views of content, a thumbnail associated with content, and/or any other suitable information. In some embodiments, this data can include information indicating which content, when presented, will be presented with an advertisement. In some embodiments, this data can specify characteristics of the advertisements to be presented with content (e.g., as described above in connection with FIG. 4).

Media content server 506 can be any suitable media content server for storing media content and for delivering the content to a user device 512 of a user in some embodiments. For example, media content server 506 can be a server that streams media content to a user device 512 via communication network 510. Media content provided by media content server 506 can be any suitable content such as video content, audio content, television programs, movies, cartoons, music, sound effects, audio-books, streaming live content (e.g., a streaming radio show, a live concert, a live political event, etc.), pre-recorded content, etc.

Advertisement server 508 can be any suitable advertisement server for storing advertisements and for delivering the advertisements to a user device 512 of a user in some embodiments. For example, advertisement server 508 can be a server that streams video advertisements (e.g., commercials) to a user device 512 via communication network 510. Advertisements provided by advertisement server 508 can be any suitable advertisements such as video advertisements, audio advertisements, commercials, graphics, text, images, video clips, etc.

Communication network 510 can be any suitable combination of one or more wired and/or wireless networks in some embodiments. For example, communication network can include any one or more of the Internet, a mobile data network, a satellite network, a local area network, a wide area network, a telephone network, a cable television network, a WiFi network, a WiMax network, and/or any other suitable communication network.

User devices 512 can include any suitable user devices for generating search requests for media content, for presenting search results to a user as described herein, and for presenting media content, in some embodiments. For example, in some embodiments, user devices 512 can include mobile devices, such as mobile phone 514, tablet computer 516, laptop computer 518, a vehicle (e.g., car, boat, airplane, etc.) entertainment system, a portable media player, etc. Although not shown in FIG. 5, as another example, in some embodiments, user devices 512 can include non-mobile devices, such as a desktop computer, a set-top box, a smart television, a streaming media player, a game console, etc.

Although search engine server 502, search engine database 504, media content server 506, and advertisement server 508 are illustrated as separate devices, any of these devices can be combined into any one or more devices in some embodiments. Also, although only one of each of search engine server 502, search engine database 504, media content server 506, and advertisement server 508 is shown in FIG. 5 to avoid over-complicating the figure, any suitable one or more of these devices can be used in some embodiments.

Although three user devices 514, 516, and 518 are shown in FIG. 5 to avoid over-complicating the drawing, any suitable number of these devices, and any suitable types of these devices, can be used in some embodiments.

Figure 6:
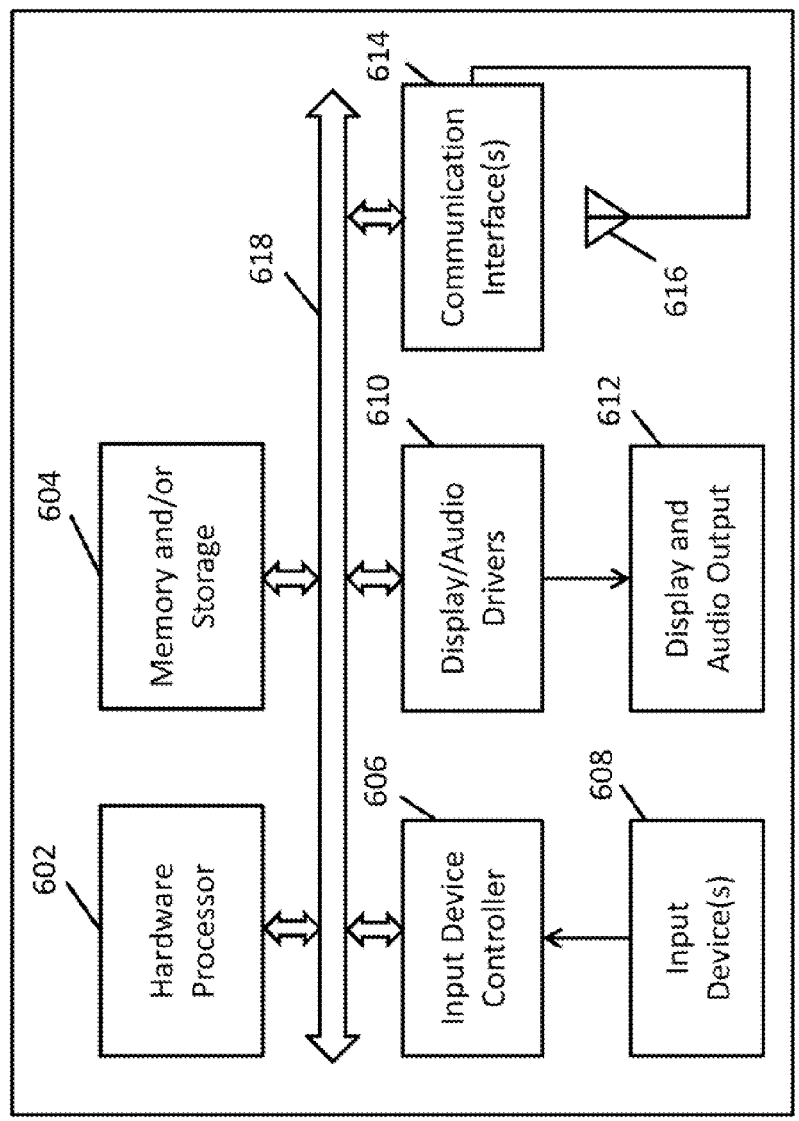
FIG. 6 is an example of hardware that can be used in a database, a server, and/or a user device in accordance with some embodiments.

Search engine server 502, search engine database 504, media content server 506, advertisement server 508, and user devices 512 can be implemented using any suitable hardware in some embodiments. For example, in some embodiments, devices 502, 504, 506, 508, and/or 512 can be implemented using any suitable general purpose computer or special purpose computer. For example, a mobile phone may be implemented using a special purpose computer. Any such general purpose computer or special purpose computer can include any suitable hardware. For example, as illustrated in example hardware 600 of FIG. 6, such hardware can include a hardware processor 602, memory and/or storage 604, an input device controller 606, an input device 608, display/audio drivers 610, display and audio output circuitry 612, communication interface(s) 614, antenna 616, and a bus 618.

Hardware processor 602 can include any suitable hardware processor, such as a microprocessor, a micro-controller, digital signal processor, dedicated logic, and/or any other suitable circuitry for controlling the functioning of a general purpose computer or special purpose computer in some embodiments.

Memory and/or storage 604 can be any suitable memory and/or storage for storing programs, data, media content, advertisements, etc. in some embodiments. For example, memory and/or storage 604 can include random access memory, read only memory, flash memory, hard disk storage, optical media, etc.

Input device controller 606 can be any suitable circuitry for controlling and receiving input from one or more input devices 608 in some embodiments. For example, input device controller 606 can be circuitry for receiving input from a touch screen, from one or more buttons, from a voice recognition circuit, from a microphone, from a camera, from an optical sensor, from an accelerometer, from a temperature sensor, from a near field sensor, etc.

Display/audio drivers 610 can be any suitable circuitry for controlling and driving output to one or more display and audio output circuitries 612 in some embodiments. For example, display/audio drivers 610 can be circuitry for driving an LCD display, a speaker, an LED, etc.

Communication interface(s) 614 can be any suitable circuitry for interfacing with one or more communication networks, such as networks 510 in some embodiments. For example, interface(s) 614 can include network interface card circuitry, wireless communication circuitry, etc.

Antenna 616 can be any suitable one or more antennas for wirelessly communicating with a communication network in some embodiments. In some embodiments, antenna 616 can be omitted when not needed.

Bus 618 can be any suitable mechanism for communicating between two or more of components 602, 604, 606, 610, and 614 in some embodiments.

Any other suitable components can be included in hardware 600 in accordance with some embodiments.

Figure 7:
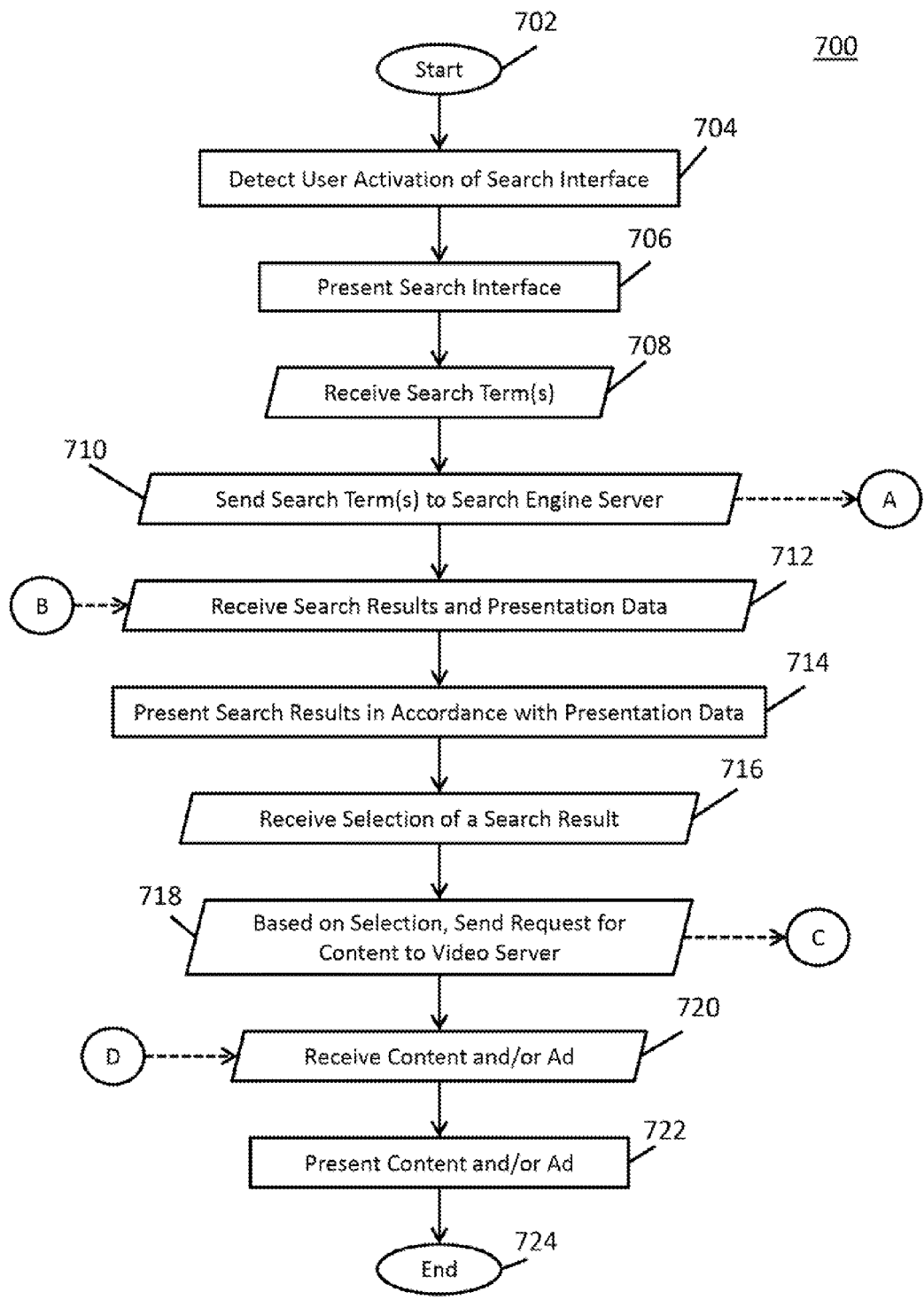
FIG. 7 is an example of a process for a user device in accordance with some embodiments.
Figure 8:
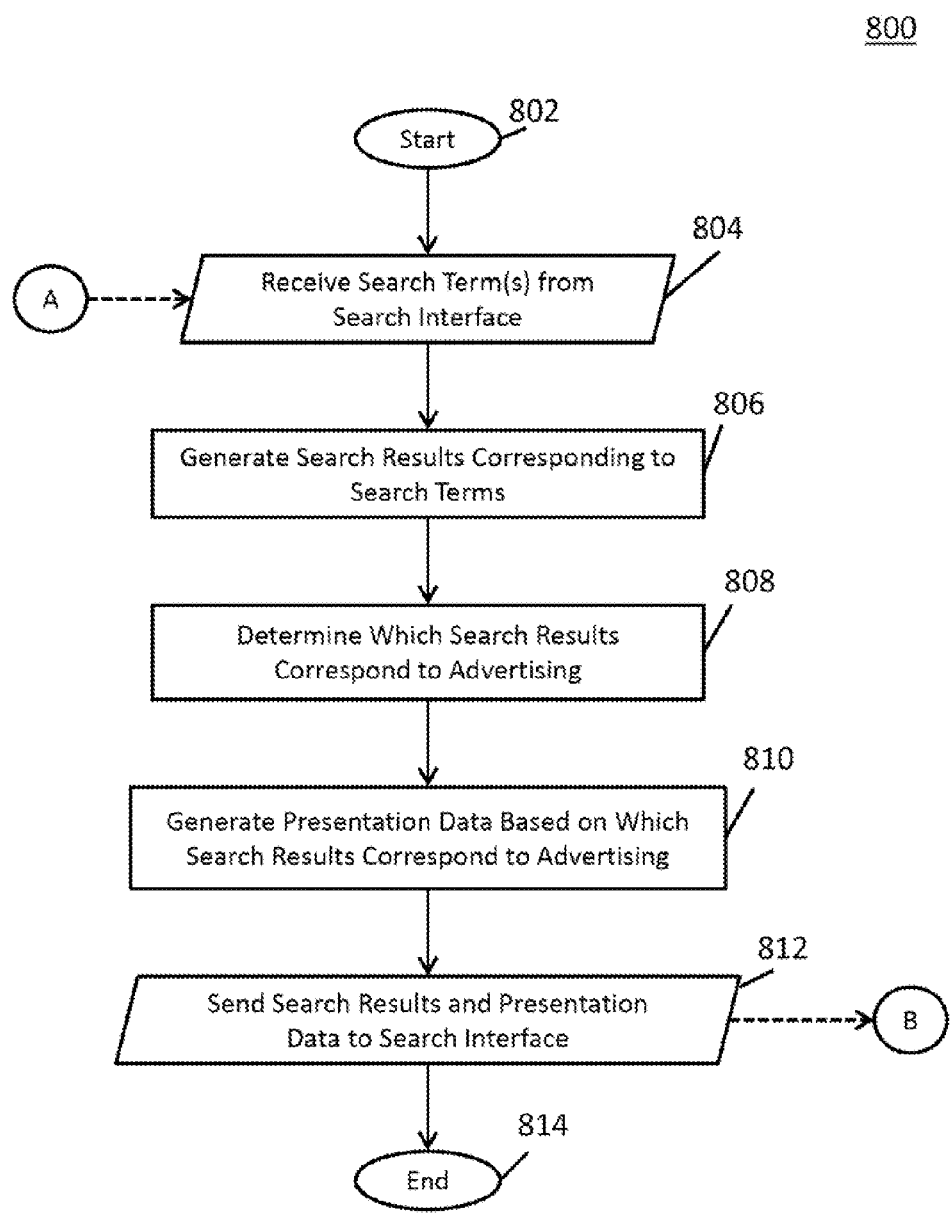
FIG. 8 is an example of a process for a search engine server in accordance with some embodiments.
Figure 9:
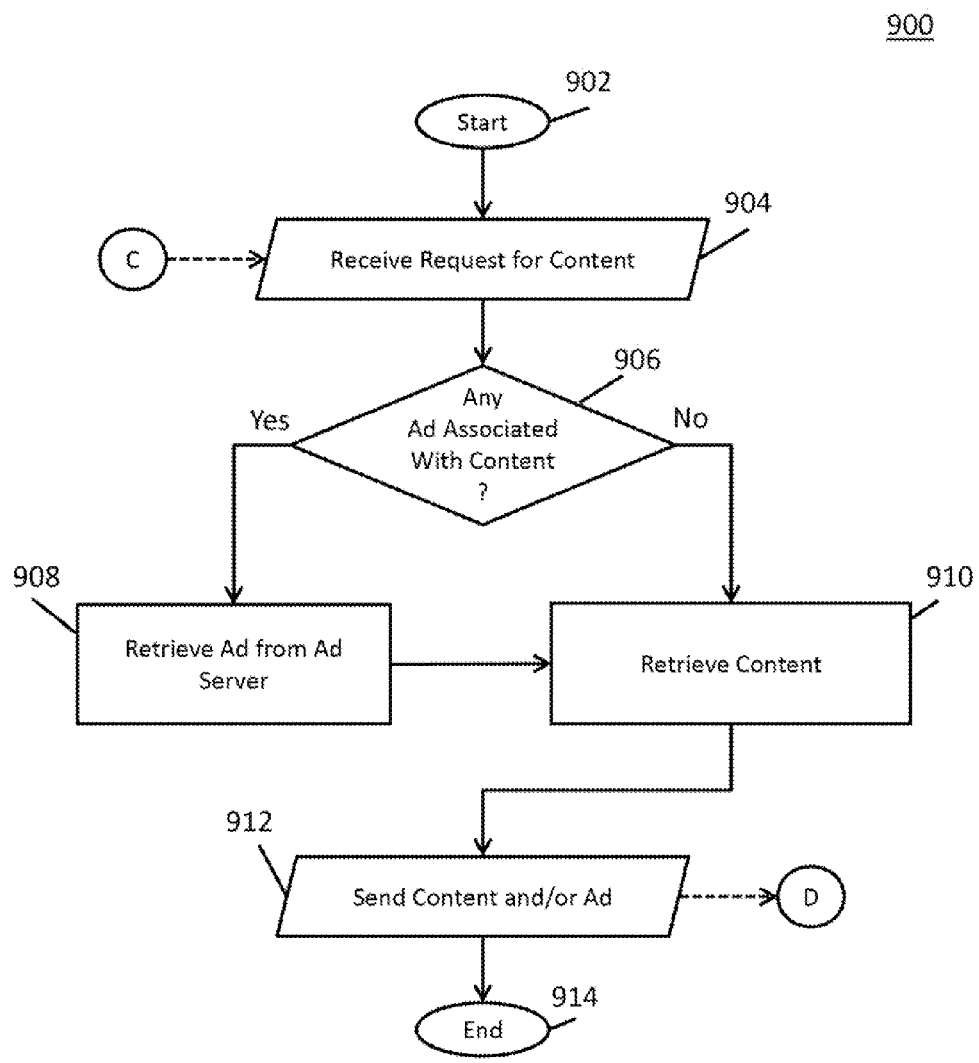
FIG. 9 is an example of a process for a media content server in accordance with some embodiments.

Turning to FIGS. 7, 8, and 9, examples 700, 800, and 900 of processes that can be performed in a user device 512, a search engine server 502, and a media content server 506, respectively, in accordance with some embodiments are shown.

More particularly, process 700 of FIG. 7 is an example of a process for requesting a search, receiving and presenting search results, and selecting and presenting media content and/or advertisements in accordance with some embodiments. Such a process can be performed in a user device 512 in some embodiments. As illustrated, after process 700 has begun at 702, the process can detect a user activation of a search interface at 704. This activation can be detected in response to a user browsing to a search engine Web page, in response to a user selecting a search widget on a user device, in response to a user activating a media player, etc.

Next, at 706, process 700 can present a search interface. Any suitable search interface can be presented. For example, in some embodiments, a search interface such as that described in any of FIGS. 1-4 can be presented in some embodiments.

At 708, the process can next receive the search terms. These search terms can be received in response to a user typing the terms, in response to a user speaking the terms, in response to the user selecting the terms from a menu, based on previously selected content, in response to the user pasting the terms, etc.

Then, at 710, process 700 can send the search terms to a search engine. These search terms can be sent in any suitable manner in some embodiments. For example, in some embodiments, these terms can be sent in any suitable protocol using any suitable type of communication interface.

Process 700 can then receive search results and presentation data at 712. Any suitable search results, in any suitable format, and any suitable presentation data can be received in some embodiments. For example, search results and presentation data as described above in connection with FIGS. 1-4 can be received in some embodiments. These search results and presentation data can be received in any suitable manner in some embodiments. For example, in some embodiments, these search results and presentation data can be received in any suitable protocol using any suitable type of communication interface.

At 714, process 700 can then present the search results in accordance with the presentation data. This presentation can be performed in any suitable manner. For example, in some embodiments, this presentation can be performed as described above in connection with FIGS. 1-4.

Next, at 716, process 700 can receive a selection of one or more of the search results in any suitable manner. For example, process 700 can receive a selection of a search result in response to a user touching a search result presented on a touch-screen display. As another example, process 700 can receive a selection of a search result in response to a user highlighting a search result and pressing an enter button or a play button.

At 718, the process can then send a request for the corresponding content to a media content server based on the selection. This request can be sent in any suitable manner in some embodiments. For example, in some embodiments, this request can be sent in any suitable protocol using any suitable type of communication interface.

At 720, process 700 can receive media content and/or an advertisement responsive to the request sent at 718. This media content and/or advertisement can be received in any suitable manner in some embodiments. For example, in some embodiments, this media content and/or advertisement can be received in any suitable protocol using any suitable type of communication interface.

Next, at 722, the media content and/or advertisement can be presented in any suitable manner. For example, an advertisement may be presented before content can be presented, an advertisement may be presented while content is being presented, etc. As another example, an advertisement and/or content can be presented as video, audio, images, text, etc.

Finally, at 724, process 700 can end.

Process 800 of FIG. 8 is an example of a process for receiving and responding to a search request in accordance with some embodiments. Such a process can be performed in a search engine server 502 in some embodiments. As illustrated, after process 800 has begun at 802, the process can receive search terms from a search interface at 804 in some embodiments. These search terms can be received in any suitable manner in some embodiments. For example, in some embodiments, these terms can be received in any suitable protocol using any suitable type of communication interface.

Next, at 806, process 800 can generate search results corresponding to the search terms in some embodiments. These search results can be generated in any suitable manner in some embodiments. For example, in some embodiments, these search results can be generated based on data received from search engine database 504 in response to a database query.

At 808, process 800 can then determine which search results correspond to advertisements. This determination can be made in any suitable manner. For example, in some embodiments, this determination can be made based on data retrieved from search engine database 504 for the search results. As another example, this information can be made based on data retrieved from media content server 506 and/or advertisement server 508.

Then, at 810, process 800 can generate presentation data based on which search results correspond to advertisements in some embodiments. Any suitable presentation data can be generated in some embodiments. For example, in some embodiments, presentation data can be generated to cause the search results and/or advertisement indications to be presented as described above in connection with FIGS. 1-4.

Once the presentation data has been generated, process 800 can then send the search results and presentation data to the search interface at 812. These search results and presentation data can be sent in any suitable manner in some embodiments. For example, in some embodiments, these search results and presentation data can be sent in any suitable protocol using any suitable type of communication interface.

Finally, at 814, process 800 can end.

Process 900 of FIG. 9 is an example of a process for receiving and responding to a request for media content in accordance with some embodiments. Such a process can be performed in a media content server 506 in some embodiments. As illustrated, after process 900 has begun at 902, the process can receive a request for content from the search interface at 904. This request can be received in any suitable manner in some embodiments. For example, in some embodiments, this request can be received in any suitable protocol using any suitable type of communication interface.

Next, at 906, the process can determine whether there is an advertisement associated with the requested media content in some embodiments. This determination can be made on any suitable basis. For example, in some embodiments, this determination can be made based on data stored in media content server 506 and/or advertisement server 508.

If it is determined at 906 that an advertisement is associated with the requested media content, then process 900 can branch to 908 to retrieve an advertisement from an advertisement server. This advertisement can be retrieved in any suitable manner. For example, in some embodiments, this advertisement can be retrieved by requesting and receiving a full copy of the advertisement. As another example, in some embodiments, this advertisement can be retrieved by requesting and receiving a link or a pointer that can be used to access a full copy of the advertisement.

If it is determined at 906, however, that no advertisement is associated with the requested media content, or after completing 908, process 900 can branch to 910 to retrieve the requested content. This content can be retrieved in any suitable manner. For example, in some embodiments, this content can be retrieved by requesting and receiving from storage in server 506 a full copy of the content. As another example, in some embodiments, this content can be retrieved by requesting and receiving a link or a pointer that can be used to access a full copy of the content.

Process 900 can then send the retrieved content and/or the retrieved advertisement to the user device at 914. This media content and/or advertisement can be sent in any suitable manner in some embodiments. For example, in some embodiments, this media content and/or advertisement can be sent in any suitable protocol using any suitable type of communication interface.

Finally, at 914, process 900 can end.

It should be understood that at least some of the above described steps of the processes of FIGS. 7-9 can be executed or performed in any order or sequence not limited to the order and sequence shown and described in the figures. Also, some of the above steps of the processes of FIGS. 7-9 can be executed or performed substantially simultaneously where appropriate or in parallel to reduce latency and processing times.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for controlling the presentation of search results with advertisement indications, comprising:
at least one hardware processor that is configured to:
receive a search request;
identify a plurality of pieces of media content corresponding to the search request;
for each of the plurality of pieces of media content, determine if an advertisement is configured to be presented with a presentation of the piece of media content;
generate search results identifying the plurality of pieces of media content; and
generate presentation data that specifies the manner in which the search results are to be presented based on the determination, wherein the presentation data specifies a font or a font style to provide an indication that an advertisement will be presented with certain content.

2. A method for controlling the presentation of search results with advertisement indications, comprising:
receiving a search request;
identifying a plurality of pieces of media content corresponding to the search request;
for each of the plurality of pieces of media content, determining if an advertisement is configured to be presented with a presentation of the piece of media content;
generating search results identifying the plurality of pieces of media content; and
generating presentation data that specifies the manner in which the search results are to be presented based on the determination, wherein the presentation data specifies a font or a font style to provide an indication that an advertisement will be presented with certain content.

3. A non-transitory computer-readable medium containing computer-executable instructions that, when executed by a processor, cause the processor to perform a method for controlling the presentation of search results with advertisement indications, the method comprising:
receiving a search request;
identifying a plurality of pieces of media content corresponding to the search request;
for each of the plurality of pieces of media content, determining if an advertisement is configured to be presented with a presentation of the piece of media content;
generating search results identifying the plurality of pieces of media content; and
generating presentation data that specifies the manner in which the search results are to be presented based on the determination, wherein the presentation data specifies a font or a font style to provide an indication that an advertisement will be presented with certain content.

* * * * *